United States Patent [19]

Zucker et al.

[11] 4,088,389

[45] May 9, 1978

[54] LARGE BANDWIDTH OPTICAL COMMUNICATION SYSTEMS UTILIZING AN INCOHERENT OPTICAL SOURCE

[75] Inventors: Joseph Zucker, Waban; Robert Lauer, Stow, both of Mass.

[73] Assignee: GTE Laboratories Incorporated, Waltham, Mass.

[21] Appl. No.: 672,577

[22] Filed: Apr. 1, 1976

[51] Int. Cl.² .............................................. G02B 5/14
[52] U.S. Cl. .............................. 350/96.15; 350/96.17; 350/166
[58] Field of Search ................. 350/96 WG, 96 C, 166

[56] References Cited

U.S. PATENT DOCUMENTS

| | | | |
|---|---|---|---|
| 3,600,062 | 8/1971 | Schineller et al. | 350/166 |
| 3,614,661 | 10/1971 | Borner et al. | 350/166 |
| 3,704,996 | 12/1972 | Borner et al. | 350/96 WG |
| 3,877,052 | 4/1975 | Dixon et al. | 350/96 C |

Primary Examiner—John K. Corbin
Assistant Examiner—Stewart Levy
Attorney, Agent, or Firm—David M. Keay

[57] ABSTRACT

The dispersion of optical signals derived from a spontaneous emitter when coupled into an optical fiber waveguide is substantially reduced by optically coupling a narrow band pass interference filter between the emitter and waveguide. Only a narrow portion of the broad spectral width emission of the emitter is thereby coupled into the waveguide to provide emitter modulation rates limited only by the rise-time of the emitter. In the preferred embodiment, the coupled spectral portion corresponds to the wavelengths of peak emission. Additionally, the filter is a thin film filter deposited onto either the light-exiting face of the emitter or onto the light-receiving end of the fiber waveguide.

16 Claims, 3 Drawing Figures

LARGE BANDWIDTH OPTICAL COMMUNICATION SYSTEMS UTILIZING AN INCOHERENT OPTICAL SOURCE

FIELD OF THE INVENTION

This invention relates to communication systems, and in particular to optical communication systems. The systems normally comprise a light source, means for modulating the light source to impress informational content thereon, means for coupling the modulated light source to an optical receiver, and photodetecting means for receiving the modulated light and for extracting the information therefrom. The term "optical link" is commonly used to denote the modulated light source, the photodetecting means and the optical fiber waveguide coupling the two. The term "light" is used herein in its broadest sense; that is, to designate the entire spectrum of radiative electromagnetic energy and is not limited to that energy within the visible portion of the spectrum.

This invention further relates to those optical communication systems having light sources modulated by large bandwidth signals, that is to say in excess of approximately 100MHz. These systems typically require light sources having narrow spectral widths, owing to the wavelength dependent dispersion characteristics of the optical fiber. This dispersion is due to the variance of the fiber material's index of refraction which varies the speed with which light is propagated through the fiber in accordance with its wavelength. Consequently, an input light pulse having components of different wavelengths will be stretched in time as it is propagated along the fiber so that a severe limitation is placed on the input frequency if the pulses are to be distinguishable by the photodetector.

DESCRIPTION OF THE PRIOR ART

In order to provide a large bandwidth optical communication system, devices of the prior art have used diode injection lasers to provide the necessary narrow spectral width required to achieve low dispersion in the optical fiber. It is, however, difficult to obtain diode lasers with the sufficiently long operating lives necessary for commercial applications. Additionally, diode lasers require very high drive power, in the order of watts, to achieve the lasing state; this is inconvenient for many systems which typically require only microwatts of signal power.

SUMMARY OF THE INVENTION

To achieve high modulation rates with an optical communication system requiring signal power levels in the microwatt range, it would therefore be advantageous to obtain narrow spectral emission widths from an incoherent emitter such as a light emitting diode. For example, the dispersion of the signal from an incoherent emitter having a 10nm spectral width would be low enough to permit modulation rates of 250MHz over a one kilometer length of a parabolic index fiber. However, the width of the spontaneously emitted band increases as the rise-time of the emitter decreases so that emitters capable of high modulation rates are limited by the dispersion characteristics of the waveguide. For example, spectral widths of about 40nm have been found for spontaneous emitters having rise-times in the order of 3ns, while emitters with 1.6ns rise-times emit a spectrum approximately 50nm wide. The latter, while otherwise capable of 225MHz operation is limited by its emitted spectral width to modulation rates of 62.5MHz when coupled to the typical fiber waveguide.

One aspect of this invention provides an optical link for an optical communications system comprising an optical fiber waveguide; a source of spontaneously emitted wideband light having a light-exiting face; and a layer of dielectric material having a pair of spaced-apart, partially reflecting surfaces, one surface being adapted for intimate coupling to the light exiting face of the source for receiving wideband spontaneously emitted light therefrom and dividing the light into a first reflected beam and a first unreflected beam, the second partially reflecting surface being adapted for intimate coupling to the fiber, and spaced apart from the first surface to reflect a portion of the first unreflected beam in a phase-shifted relation with the first reflected beam, the spacing between the surfaces being selected to create a 180° phase difference between wavelength components of the two reflected light beams within a narrow spectral width, whereby the two reflected beams destructively interfere within the narrow spectral width and the consequently absent components in the combined reflection thereby predominate in the light passing through the second partially reflective surface for coupling into the fiber.

These and other features of the invention will be more clearly understood from the following detailed description and the accompanying drawings.

DESCRIPTION OF THE PREFERRED EMBODIMENT

Figure 1:
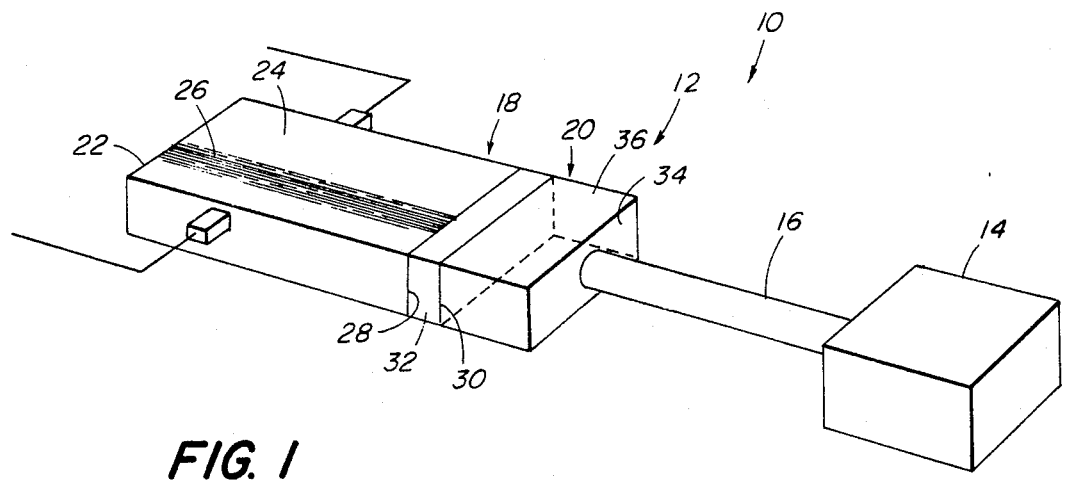
FIG. 1 is a schematic representation showing one embodiment of an optical link according to the invention.

FIG. 1 is a schematic representation showing one embodiment of an optical link in accordance with the invention. The optical link shown generally at 10, comprises a modulated source of narrow spectral width light 12, means for receiving the modulated light 14 such as a photodetector, and an optical fiber waveguide 16 coupling the modulated light source to the optical receiver.

The source 12 comprises a spontaneous emission region 18 and a narrow band pass region 20. The spontaneous emission region 18, in turn, comprises an active region of p-type semiconducting material 22 and a second region of n-type semiconducting material 24 contacting the active region 22 along a p-n junction 26. The manner by which incoherent light is spontaneously emitted within such a region, is known in the art and provides the mechanism by which such emitters such as light emitting diodes function. The semiconductive material typically comprises a material formed from Group III-V elements. A portion of the material is doped with an electron-acceptor impurity to form p-type material while a second portion is doped with an electron-donor type impurity to form an n-type material. With reference to FIG. 1, electrons are injected from a region 22, containing the n-type material across the junction 26 into the active p-type region 24. An electrostatic charge across the junction 26 presents a barrier to the injected carriers, thereby limiting the amount of carrier diffusion across the junction. Means for injecting additional carriers across the junction may be provided by the application of a properly polarized voltage across the regions, i.e., the application of a "forward bias" whereby the region 24 is held at a positive potential with regard to the region 22. The carriers from n-type region 22 cross the junction 26 and recombine with holes in the region 24, emitting energy in the form of radiation in the process.

It should be noted that the foregoing description is only illustrative and that many variations known in the art are certainly within the scope of the invention. For example, LED's having active n-type regions are known and may be equally utilized.

In the preferred embodiment, the region 24 has a composition described by $Al_xGa_{1-x}As$ (0 < X < 0.15), the region 22 is described by the composition $Al_{0.3}Ga_{0.7}As$, and the resulting wideband spontaneous emission 20 has a spectral width in the range of 25 to 50nm, depending on the atomic indentity and concentration of the p-type dopant.

The wideband spontaneously emitted light emerges from a light exiting face 28 of the semiconductive material and is received by a partially reflecting face 30 of a dielectric material 36. In the preferred embodiment, the partially reflecting face 30 comprises a metal film so that it becomes desirable to include an insulating layer 32 between the semiconductive material of regions 22 and 24 and the narrow band pass region 20. The band pass layer 20 further comprises a second partially reflecting surface 34 spaced from the first surface 30 by a distance related to the narrow spectral component of light to be propagated through the fiber 16. The operation of the narrow band pass layer 20 may be best understood by reference to FIG. 2.

Figure 2:
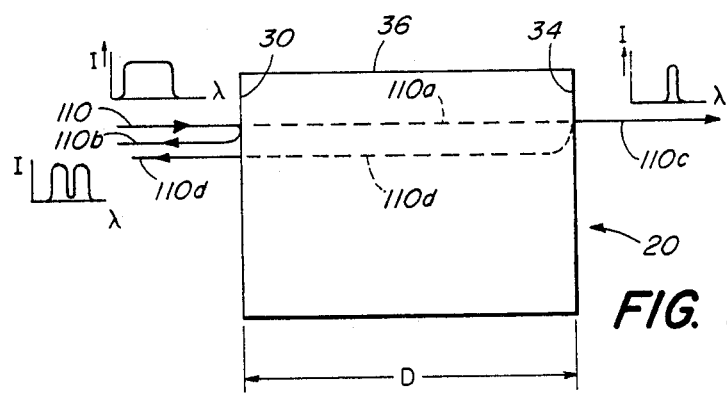
FIG. 2 is a schematic representation showing the narrow band pass layer associated with the invention.

FIG. 2 is a schematic representation of the narrow band pass region associated with the narrow spectral width light emitting source made in accordance with the invention. To aid in the explanation, related components of the band pass layer of FIG. 1 have been identically identified in FIG. 2. In FIG. 2, the region 20 is shown having a first partially reflecting face 30, and a second partially reflecting face 34 spaced apart by a distance D. Spontaneously emitted broad spectrum width light 110, is shown incident upon the first partially reflecting face 30. A portion 110a of the light 110 passes through the first partially reflecting surface 30 and is transmitted towards the second partially reflecting surface 34. The remaining portion 110b of the incident light 110 is reflected off the surface 30. The transmitted portion 110a of incident light is again partially transmitted through the second partially reflecting surface 34 as at 110c, and partially reflected back towards the first surface 30 as at 110d. For clarity, the reflected beams are shown as displaced although in practice the paths are essentially coincident. If the distance D is such that the light 110d is 180° out of phase with the light 110b, the two waves will have a destructive phase relationship and will tend to cancel. The resultant spectral composition of the combined reflected light 110b, 110d, will therefore comprise the spontaneously emitted spectrum less the destructively reflected spectrum. The destructively reflected spectrum, in turn, will predominate the light 110c transmitted from the narrow pass region 36 since the transmitted beam must necessarily complement the reflected beam.

It is apparent that a phase change of 180° will occur when $2D = K \cdot \lambda/2$ or $D = \lambda/4 \cdot K$, where K is an integer. It may be further appreciated that the index of refraction (n) associated with the dielectric material of the narrow band pass region 36, changes the wavelength of light entering therein. Specifically, $\lambda = \lambda_a/n$, where $\lambda_a$ is the wavelength of light in air, $\lambda$ is the wavelength of light in the region 36. Accordingly, the spacing D may be expressed as $D = K \lambda_a/4n$. The narrow band pass region 20 receives incident broadband light having a spectral width of approximately 35nm and transmits a narrow spectrum of light having a bandwidth of approximately 10nm for propagation through the optical fiber. The partially reflective surfaces preferably comprise silver or gold films having a thickness in the range of 30 to 40nm. The particular material used is dependent upon the portion of the electromagnetic spectrum involved. Gold is typically used for emitted light having a wavelength greater than 750nm, while silver is typically preferred for light of less than 800nm.

The dielectric layer 36 may be selected from the group consisting of magnesium fluoride ($MgF_2$), zinc sulfide (ZnS) or silicon oxide ($SiO_2$). The insulating material may conveniently be silicon oxide.

Comparison of the broad incident spectrum and the narrow transmitted spectrum which respectively enter and leave the region 36, reveals that a 50% transmission rate for the wavelength of peak transmission may be expected, with greatly diminished rates for wavelengths outside the narrow spectrum. Additionally, the relative intensities of the transmitted spectral components may be enhanced by selecting as the wavelength of peak transmission, the wavelength of peak emission which is a characteristic of the LED semiconductive material. Accordingly, the thickness of the dielectric material ("D" in FIG. 2) may be chosen to provide destructive reflection of the incident spectral component which corresponds to the peak emitted wavelength.

Attention is now turned to the manner by which the components of the optical link may be optically coupled. In the embodiment disclosed in FIG. 1, the narrow band pass region 20 is monolithically integrated to the region 18. The partially reflecting surface 30 intimately contacts the light exiting face 28, and may, for example, be deposited thereon. In the preferred embodiment, an insulating layer 28 is desirable owing to the use of a metallic film for the partially reflecting surface 30. The insulating layer 32 having a thickness in the range of 200 to 500nm is consequently deposited on the light exiting face 28. The partially reflective surface 30, the dielectric layer 36, and the partially reflecting surface 34 are respectively deposited in a successive manner upon the preceding layer. The optical fiber waveguide 16 may then be intimately coupled to the surface 34.

Figure 3:
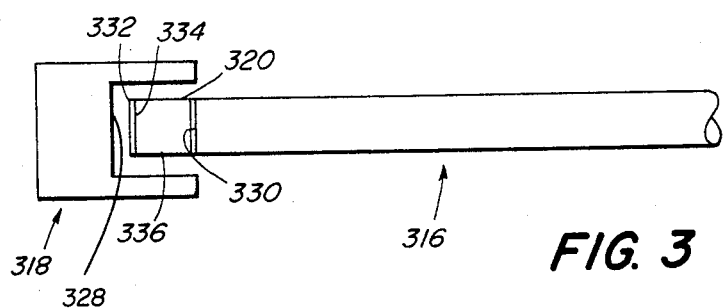
FIG. 3 is a schematic representation showing a second embodiment of an optical link according to the invention.

An alternative embodiment of the invention is shown in FIG. 3, which is a schematic representation thereof. To aid in the explanation previously described, elements have been designated with similar identifying numbers. With reference to FIG. 3, there is shown a spontaneous light emitting diode 318 coupled to an optical fiber to 316. Monolithically integrated to one end of the fiber is a narrow band pass region 320 comprising a first partially reflecting face 330, a dielectric material 336, and a second partially reflecting face 334. The partially reflecting surfaces preferably comprise metal films such as silver and gold which may be monolithically integrated with the dielectric material 336 by a process such as vacuum deposition. Consequently, it is desirable to additionally provide an insulating layer 332 intimately contacting the light exiting surface 328 of the diode 310 to support the metallic film away from the semiconductive face material. The insulating layer 332 may be monolithically integrated with the light emitting face 328 of the diode 318 or, as shown, with the narrow band pass layer 332. The metal film of the first partially reflecting surface 330 is preferably deposited onto the tip of the optical fiber 316 followed by the dielectric layer 336, the metal film of the second partially reflecting surface 334 and, if desirable, the insulating layer 332.

Naturally, there are variations in the described embodiments which are obvious to one skilled in the art, and may be made without departing from the spirit of the invention as defined by the appended claims.

We claim:

1. In an optical communications system, an optical link comprising:
   an optical fiber waveguide;
   a source of spontaneously emitted wideband light having a light-exiting face; and
   a layer of dielectric material having a pair of spaced-apart, partially reflecting surfaces, one partially reflecting surface being adapted for intimate coupling to the light-exiting face of the source for receiving wideband spontaneously emitted light therefrom and dividing the light into a first reflected beam and a first unreflected beam, the second partially reflecting surface being adapted for intimate coupling to the waveguide and spaced apart from the first surface to reflect a portion of the first unreflected beam in a phase-shifted relation with the first reflected beam,
   the spacing between the surfaces being selected to create a 180° phase difference between wavelength components of the two reflected light beams at a selected wavelength,
   whereby the two reflected beams destructively interfere within a narrow spectral width and the consequently absent components in the combined reflection thereby predominate in the light passing through the second partially reflecting surface for coupling into the waveguide.

2. The optical link of claim 1 wherein the two partially reflecting surfaces are spaced such that the two reflected light beams destructively interfere with each other at the wavelength of peak spontaneously emitted light intensity, thereby enhancing the resultant transmission at the desired wavelength.

3. The optical link of claim 1 wherein each partially reflecting surface comprises a metallic film.

4. The optical link of claim 3 wherein the metallic film is selected from the group consisting of silver and gold.

5. The optical link of claim 4 wherein the films are each within the range of 30 to 40nm thick.

6. The optical link of claim 3 including insulating means supporting the one partially reflecting surface away from the light-exiting face of the source.

7. The optical link of claim 6 wherein the insulating means includes a layer of insulating material intimately coupling the light-exiting face and the one partially reflecting surface.

8. The optical link of claim 7 wherein the layer of insulating material comprises a deposited film of silicon dioxide.

9. The optical link of claim 7 wherein the layer of insulating material is monolithically integrated with the light-exiting face, and the layer of dielectric material is monolithically integrated with the layer of insulating material.

10. The optical link of claim 7 wherein the layer of dielectric material is monolithically integrated with the light receiving end of the waveguide.

11. For use in the optical link of an optical communications system, a source of modulated narrow spectral width light comprising:
    semiconductive material having a light-exiting face, an n-type region of electron carriers, and an active p-type region contacting the n-type region along a p-n junction, the two regions possessing energy band gaps which permit spontaneously emitted wideband radiation to accompany the recombination of electron carriers injected across the junction;
    means for selectively inducing carrier injection across the junction to spontaneously emit wideband light through the light-exiting face;
    a narrow band pass layer having a pair of spaced-apart partially reflecting surfaces, one partially reflecting surface being intimately coupled to the light-exiting face of the semiconductive material to partially reflect light and to transmit the unreflected light towards the second partially reflecting surface, the second partially reflecting surface partially reflecting light back through the first partially reflecting surface in a phase-shifted relation with the light reflected from the one partially reflecting surface, the partially reflecting surfaces being spaced so that the wavelengths of light within a narrow spectral width of the light reflected from the one partially reflecting surface and the light reflected from the second partially reflecting surface destructively combine.

12. The source of claim 11 wherein the narrow band pass layer is monolithically integrated with the light-exiting face of the semiconductive material.

13. The source of claim 12 including a film of insulating material deposited on the light-exiting face to form a substrate; and
    a first metallic film deposited on the substrate to form the one partially reflecting surface.

14. The source of claim 13 including a dielectric film deposited on the first metallic film; and
    a second partially reflecting metallic film deposited on the dielectric film and spaced thereby from the first metallic film to reflect in a phase-shifted manner the light passing through the first metallic film, so that the wavelength components of the light reflected by the first and second metallic films within a narrow spectral width destructively combine.

15. A method for transmitting a high band width optical signal comprising the steps of:
    (a) modulating a source of spontaneously emitted light;
    (b) filtering out all but a narrow spectral width portion of the light, the filtering step comprising
    partially reflecting the spontaneously emitted light from a first surface,
    partially reflecting the unreflected spontaneously emitted light from a second surface to establish a destructive phase relationship between the two reflected portions over a narrow band of spectral wavelengths, whereby the destructively reflected wavelengths predominate within the spectrum of the light portions passing through the two surfaces; and
(c) coupling the narrow spectral width portion to an optical fiber waveguide.

16. The method of claim 15 wherein the unreflected spontaneously emitted light is partially reflected from a second surface which is spaced from the first surface so as to establish the destructive phase relation at a spectral wavelength approximately equal to the wavelength of peak emission from the source.

* * * * *